March 5, 1929.  F. CASSULLO  1,704,654
TOOL FOR MAKING METALLIC PLATES FOR SUPPORTING ARTIFICIAL TEETH
Filed Nov. 28, 1927  2 Sheets-Sheet 1
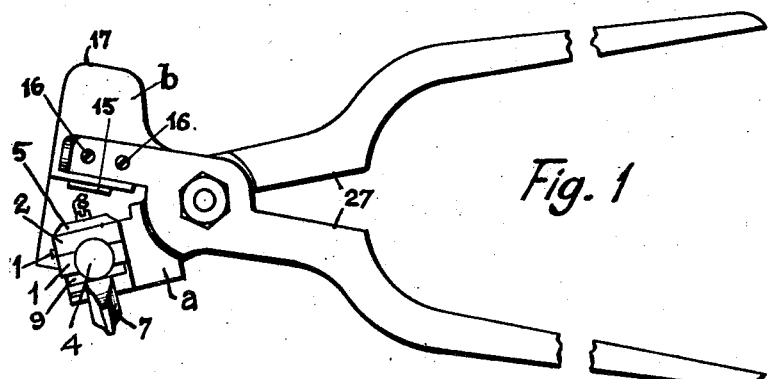
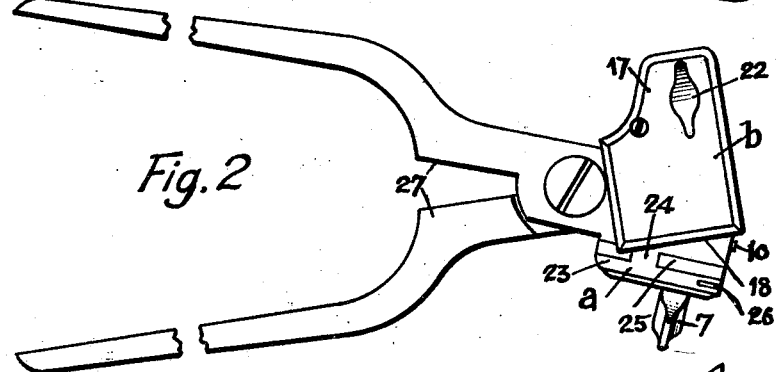
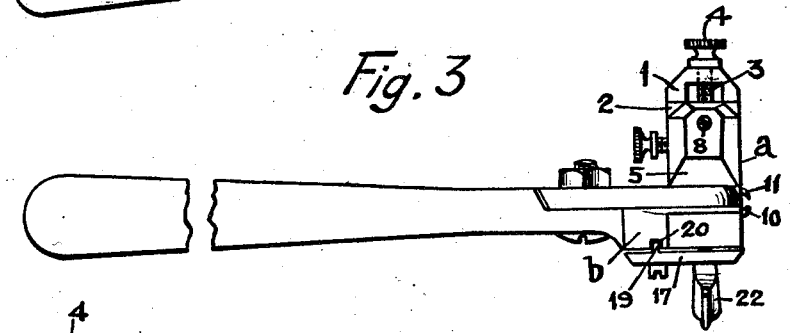
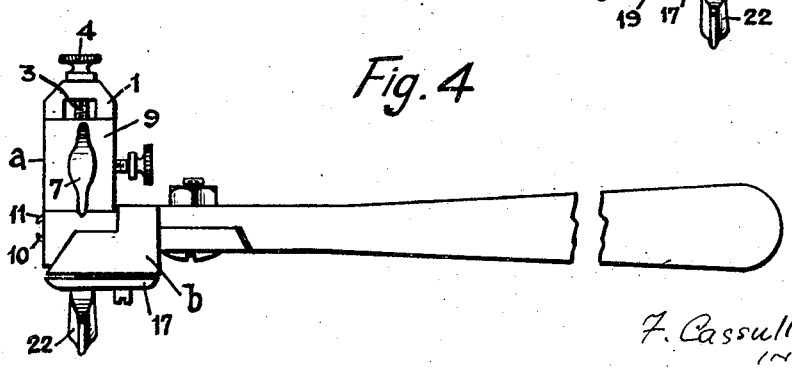

March 5, 1929.    F. CASSULLO    1,704,654
TOOL FOR MAKING METALLIC PLATES FOR SUPPORTING ARTIFICIAL TEETH
Filed Nov. 28, 1927    2 Sheets-Sheet 2
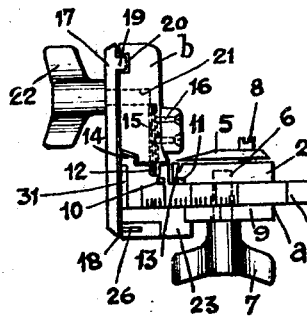
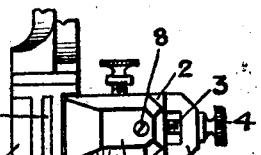
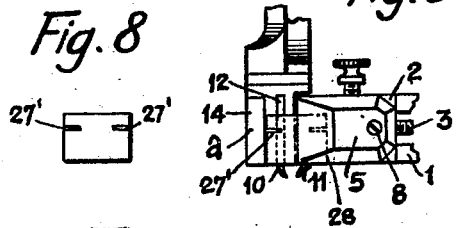
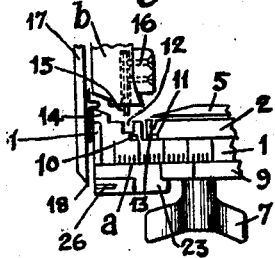
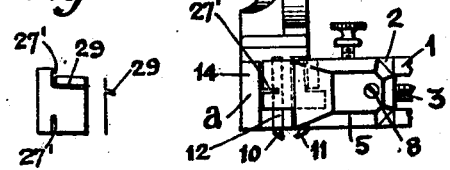
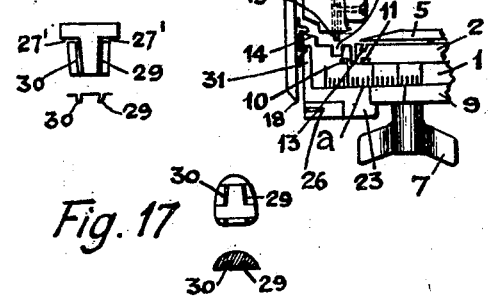
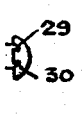
F. Cassullo
INVENTOR
By: Marks & Clerk
Attys Patented Mar. 5, 1929.

1,704,654

UNITED STATES PATENT OFFICE.

FRANCESCO CASSULLO, OF VEREZZI, ITALY.

TOOL FOR MAKING METALLIC PLATES FOR SUPPORTING ARTIFICIAL TEETH.

Application filed November 28, 1927, Serial No. 236,319, and in Italy May 14, 1927.

There are known detachable artificial teeth prepared according to a former patent of the applicant of the present invention, having two rear grooves in which are set corresponding projections of a metallic plate which partially or wholly covers the back side of the tooth. This metallic plate may then be soldered upon a further metallic plate at its turn fastened upon a set of sound teeth or connected by means of projections with plastic material.

These artificial teeth did not find hitherto any application for the lack of a tool adapted for the preparation of these artificial teeth bearing plates, which manufacture is somewhat difficult on account of the diversity of the projections which have to slightly vary according to the size of teeth with which they have to be combined.

Object of the present invention is to create a tool for dentists adapted for an easy making of these artificial teeth bearing plates.

According to the invention this tool assumes preferably the shape of a pair of nippers the shanks of which are supplied with means for measuring, cutting and shaping the artificial teeth bearing plate.

It is understood that these means for the manufacture of the artificial teeth bearing plates could also assume any other arrangement; for instance a part of them could be arranged on a stationary bed or base and the other part upon a movable element as it exists in the known screw presses or otherwise.

In the annexed drawings is shown a preferred form of execution of the present invention as a tool combined with a pair of nippers.

Figures 1 and 2 show the tool in two opposite side views; Figure 3 shows the tool seen from the top and Fig. 4 the tool seen from the bottom; Fig. 5 is a front view of the tool with the two shanks in closed position; Figure 6 is a top view of the slide carrying shank of the tool; Figures 7, 8, 9, 10, 11, 12, 13, 14, 15 and 16 show different conditions in the making of the plate and different details of the tool in connection with the teeth bearing plate in its different conditions of manufacture in order to illustrate the use of the tool for the manufacture of these plates; Figure 17 shows an artificial tooth supplied with a tooth bearing plate; Figure 18 shows an artificial tooth supplied with a tooth bearing plate provided with pivots directed towards the inside of the tooth adapted to fasten the tooth with plastic material.

In these figures the shank $a$ of the nippers is formed so as to present a right angular guide bar 1 upon the one face of which is arranged the slide 2 which can be displaced by means of the screw 3 operated by the thumb button 4. 5 is a plate arranged upon the slide 2 connected at one end of a screw 6 which screw attraverses the slide 2 and the bar 1 and carries at its free end the winged nut 7 by the rotation of which the plate 6 can be adjusted with regard to the slide 2. 8 is a pin fastened upon the slide 2 surrounded by a spiral spring (not illustrated) which tends to keep the plate 5 distantiated from the slide 2. 9 is a plate fastened with the slide 2 arranged slidably upon the face of the guide bar 1 opposite to the face on which runs the slide 2, so that by the operation of the screw 3 in rotating the button 4, the slide 2 as well as the plate 9 can be displaced contemporaneously on the guide bar 1. 10 is a tooth arranged on the slide 2 and 11 is a stationary tooth on the guide bar 1 in line with the tooth 10. 12 is a groove on the guide bar 1 and 13 is an inclined groove arranged upon the slide 2; 14 is an inclined edge running along the outer border of the guide bar 1. $b$ is the second shank of the nippers. Upon the shank $b$ is fastened, in a plane which corresponds with the groove 12 on the shank $a$, the forming blade 15 fastened on said shank by the screws 16 so as to render the blade adjustable and replaceable. The shank $b$ carries besides upon its end face a plate 17 supplied in 18 with a cutting edge. This plate is engaged with the shank $b$ by means of a shoulder 19, which projects within a corresponding groove 20 of the shank. A screw 21 fastened with its one end upon the shank $b$ attraverses the plate 17 and carries at its free end a winged nut 22, by the rotation of which the plate 17 can be adjusted upon the shank $b$. 23 is a bracket integral by means of the rib 24 (Fig. 2) with a shank $a$, so as to present an opening 25 between the bracket 23 and the shank $a$ (Figures 2 and 5) for the introduction of the plate to be cut at the desired width. The bracket 23 is supplied with a cut 26 within which is inserted the plate properly cut in width and height for the purpose to supply it with two opposite short cuts (Fig. 8) before the formation of the projections on the plate takes place. These two opposite cuts divide the plate in two sections;

the upper one of rectangular shape has to lean over the total width against the upper part of the back side of the tooth and the lower one, provided with projections, to lean against the lower part of the back side of the tooth with the projections engaged with two parallel grooves. 27 are two plane faces opposite each other upon the two shanks of the nippers which contact upon each other at closed nippers. These faces allow to straighten and to smooth the plates during the different phases of its formation.

For the manufacture of the teeth bearing plates according to the present invention one proceeds as follows:—

The artificial tooth for which the plate is destined is placed with its two grooves against the teeth 10 and 11 on the slide 2 and on the guide bar 1 respectively and the slide 2 displaced until said teeth correspond exactly with the grooves of the artificial tooth. There is now taken a piece of sheet metal having the height of the artificial tooth and the width of this piece is determined by the tool by introducing the metal piece within the opening 25 against the plate 9 which has before been adjusted with the displacement of the slide 2 and is assuming now such a position that in bringing the metal strip in touch with it and in closing the shanks of the nippers the cutting edge 18 will cut the plate at the desired width.

The plate which has now the right width assumes the form of Fig. 7 and is now introduced within the cut 26 and twice subjected to the cutting of the knife 18, resulting in the plate being supplied with two opposite cuts 27' as shown from Fig. 8. The plate is now placed upon the shank $a$ (Fig. 9) so that the cuts 27' have the direction of the shank $a$ and one edge of the plate is leaning against a stop of the shank; the winged nut 7 is then tightened thereby clamping the outer edge 28 of the plate between the slide 2 and the plate 5. The shanks of the nippers are now closed; through this closure the forming blade 15 produces a projection 29 in the plate, which latter assumes the form as results from Fig. 10. This projection is slightly inclined with reference to the plane of the plate and also with reference to the outer edge of the plate. The plate is now taken from the nippers and kept against the end face of the shank $b$ so that the projection 29 is leaning against the edge 14 whilst the plate, in closing the nippers is guided between the plate 17 and the shank $b$. By this operation, which results by a position of the shanks as same is illustrated in Fig. 11, the projection 29 is compressed and produces a plate as illustrated in Fig. 12 which shows a projection 29 slightly inclined to the plane of the plate as well as to the adjacent outer edge of the plate.

The plate is now again placed upon the shank $a$ however in an inverted position to the former one and so that the projection 29 is engaged with the groove 13 of the slide. After the plate has been brought in this position the winged nut 7 is tightened and the shanks of the nippers closed whereby on the plate is produced the second projection 30 which results slightly divergent to the first projection 29 the plate resulting in the form as shown in Fig. 14. The plate is now again placed against the end face of the shank $a$ so that its projection 29 penetrates in the cavity 31 upon the end face of the shank $a$ below the inclined edge 14. By closing now the two shanks of the nippers during which performance the plate is guided between the plate 17 and the shank $b$ (Fig. 15) the second projection 30 will be compressed and finally created a plate as shown by Fig. 16 with two projections 29, 30 slightly inclined upon the plate and slightly divergent to another.

The plate thus manufactured is now inserted upon the artificial tooth for which the same has been prepared. In this position of the artificial tooth bearing plate the outer edge of the upper rectangular section of the plate will be cut so as to assume a border line corresponding with the shape of the crown of the tooth. The plate is now fastened on the tooth by cement and afterwards fastened by soldering upon a metallic plate connected with the set of sound teeth. In the case that the application of the plate has to take place upon plastic material the side edges 32 of the plate are bent towards the inside as results from Fig. 18 for the purpose to constitute retaining edges within the plastic material.

I claim:—

1. Improved tool of the class specified, comprising a pair of nippers one shank of which formed as a right angular guide bar, a slide arranged on the guide bar, a measuring tooth on the guide bar and a measuring tooth on the slide in line with the first one, and a cutting plate arranged on the second shank of the tool so that by adjusting the slide until the two measuring teeth correspond with the width of the grooves on the artificial tooth, the bearing plate inserted in the tool can be cut at the requested width.

2. Improved tool of the class specified, comprising a pair of nippers one shank of which formed as a right angular guide bar, a slide arranged on this guide bar, a measuring tooth on the guide bar and a measuring tooth on the slide in line with the first one, a plate bearing surface on the guide bar in line with the upper face of the slide, an outer edge limiting laterally said bearing surface, a groove within the bearing surface in correspondence with a forming blade on the other shank of the nippers and an adjustable cover plate upon the slide to enable in positioning a cut plate with one side against the mentioned outer edge on the bearing surface and in fastening the opposite side between cover plate and slide the impression of a first projection in the bearing plate.

3. Improved tool of the class specified, comprising a pair of nippers one shank of which is formed as a right angular guide bar, a slide arranged on this guide bar, a measuring tooth on the guide bar and a measuring tooth on the slide in line with the first one, a plate bearing surface on the guide bar in line with the upper face of the slide, an outer edge limiting laterally said bearing surface, a groove within the bearing surface in correspondence with the forming blade on the other shank of the nippers, an adjustable cover plate upon the slide, a retaining groove on the slide to enable, in positioning the plate supplied with one projection with this projection in engagement with the groove on the slide, in closing the tool the formation of the second projection.

4. Improved tool of the class specified, comprising a pair of nippers one shank of which formed as a right angular guide bar, a slide arranged on this guide bar, a measuring tooth on the guide bar and a measuring tooth on the slide in line with the first one, a plate bearing surface on the guide bar in line with the upper face of the slide, an outer edge limiting laterally said bearing surface, a groove within the bearing surface in correspondence with a forming blade on the other shank and an adjustable cover plate and a retaining groove on the slide, a shaping edge on the end face inclined towards the inside adjacent to the mentioned outer edge and a corresponding shaping edge on the opposite second shank, a plate adjustably fastened against the end face of the second shank to enable the compression and definite shaping of the projections when placed between the mentioned shaping edges and the plate guided between the adjustable plate and the end face of the shank.

5. Improved tool of the class specified according to claim 4 characterized in this that the plate adjustably fastened against the end face of the second shank is supplied with a cutting edge and when tightened passes tightly over the end face of the first shank so as to comply with the cutting of the bearing plate arranged on the first shank.

In testimony whereof I have signed my name to this specification.

FRANCESCO CASSULLO.